US010242057B2

(12) United States Patent
Bendel et al.

(10) Patent No.: US 10,242,057 B2
(45) Date of Patent: Mar. 26, 2019

(54) DISTRIBUTED SYSTEM WITH ACCELERATOR AND CATALOG

(71) Applicant: International Business Machines Corporation, Armonk, NY (US)

(72) Inventors: Peter Bendel, Holzgerlingen (DE); Oliver Benke, Stuttgart (DE); Oliver Draese, San Jose, CA (US); Namik Hrle, Boeblingen (DE); Ruiping Li, San Jose, CA (US); Roland Seiffert, Herrenberg (DE); Knut Stolze, Jena (DE); Maryela E. Weihrauch, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 15/001,298

(22) Filed: Jan. 20, 2016

(65) Prior Publication Data

US 2016/0210328 A1 Jul. 21, 2016

(30) Foreign Application Priority Data

Jan. 20, 2015 (GB) .................................. 1500934.3

(51) Int. Cl.
*G06F 17/30* (2006.01)

(52) U.S. Cl.
CPC .. *G06F 17/30466* (2013.01); *G06F 17/30345* (2013.01); *G06F 17/30557* (2013.01)

(58) Field of Classification Search
CPC ........... G06F 17/3051; G06F 17/30566; G06F 17/30345; G06F 17/30557
See application file for complete search history.

(56) References Cited

U.S. PATENT DOCUMENTS

| 5,970,490 | A | 10/1999 | Morgenstern |
| 6,003,025 | A | 12/1999 | Prager |
| 6,078,924 | A | 6/2000 | Ainsbury |
| 6,236,994 | B1 | 5/2001 | Swartz |
| 6,240,416 | B1 | 5/2001 | Immon |
| 6,611,838 | B1 | 8/2003 | Ignat |
| 7,150,015 | B2 | 12/2006 | Pace |
| 7,634,484 | B2 * | 12/2009 | Murata ............. G06F 17/30038 |
| 7,752,230 | B2 | 7/2010 | Bland et al. |
| 7,853,554 | B2 | 12/2010 | Wan |
| 8,195,602 | B2 | 6/2012 | Bakalash et al. |
| 8,352,443 | B1 * | 1/2013 | Polson .................... G06T 17/00 382/293 |
| 9,177,172 | B2 | 11/2015 | Robinson |

(Continued)

OTHER PUBLICATIONS

Bendel et al., "Distributed System With Accelerator and Catalog", Application No. 1500934.3 filed Jan. 20, 2015.

(Continued)

*Primary Examiner* — Merilyn P Nguyen
(74) *Attorney, Agent, or Firm* — David B. Woycechowsky

(57) ABSTRACT

A distributed database system (or federated database system) where a catalog is used to store metadata descriptive of data containers for the constituent database system(s) and/or accelerator system(s) of the federated database. In response to the generation of the trigger signal corresponding to a database definition language (DDL) statement, the accelerator system updates metadata in the catalog.

13 Claims, 3 Drawing Sheets

(56) References Cited

U.S. PATENT DOCUMENTS

| | | | |
|---|---|---|---|
| 9,460,173 B2 | 10/2016 | Abrams | |
| 9,805,092 B1 | 10/2017 | Welton et al. | |
| 2004/0064819 A1* | 4/2004 | LaVoie | G06F 12/0875 719/310 |
| 2006/0265385 A1 | 11/2006 | Agrawal | |
| 2010/0023496 A1 | 1/2010 | Mohan | |
| 2011/0125776 A1* | 5/2011 | Roshen | G06F 17/30887 707/769 |
| 2011/0231447 A1* | 9/2011 | Starkey | G06F 17/30575 707/792 |
| 2012/0059807 A1 | 3/2012 | Brooks et al. | |
| 2012/0259824 A1 | 10/2012 | Zagelow et al. | |
| 2012/0323884 A1 | 12/2012 | Draese et al. | |
| 2013/0332694 A1 | 12/2013 | Reissner | |
| 2014/0046926 A1* | 2/2014 | Walton | G06Q 50/22 707/710 |
| 2014/0095441 A1 | 4/2014 | Draese et al. | |
| 2014/0095443 A1* | 4/2014 | Draese | G06F 17/30289 707/661 |
| 2014/0095530 A1 | 4/2014 | Lee | |
| 2014/0379632 A1* | 12/2014 | Gera | G06F 9/5061 707/608 |
| 2015/0200967 A1 | 7/2015 | Redlich | |

OTHER PUBLICATIONS

Bendel et al., "Distributed System With Accelerator-Created Containers", Application No. 1500937.6 filed Jan. 20, 2015.

IBM, "DB2 Analytics Accelerator for z/OS", provided by inventor in Main Idea of Disclosure dated May 6, 2014, <http://www-03.ibm.com/software/products/de/db2analacceforzos>, 2 pages.

IBM, "Creating a clone table", DB2 11—Administration, provided by inventor in Main Idea of Disclosure dated May 6, 2014, <http://www-01.ibm.com/support/knowledgecenter/api/content/nl/en-us/SSEPEK_11.0.0/com.ibm.db2z11.doc.admin/src/tpc/db2z_createclonetable.dita>, 2 pages.

IBM, "Publications for the IBM Informix family of products", provided by inventor in Main Idea of Disclosure dated May 6, 2014, <http://www-01.ibm.com/support/docview.wss?uid=swg27010058#wq710>, 11 pages.

IBM, "Using a Select . . . Into Statement", provided by inventor in Main Idea of Disclosure dated May 6, 2014, <http://www-01.ibm.com/support/knowledgecenter/api/content/nl/en-us/SSGU8G_11.70.0/com.ibm.sqls.doc/ids_sqs_1332.htm>, 1 page.

IBM, "What is transparent DDL", IBM InfoSphere Federation Server, Version 10.5, provided in IP&L Disclosure Evaluation dated Aug. 15, 2014, <https://www-304.ibm.com/support/knowledgecenter/api/content/nl/en-us/SSEPGG_10.5.0/com.ibm.swg.im.iis.fed.sysadmin.doc/topics/cfpddl01.html>, 2 pages.

"Temporary Table Support for DB2 under z/OS", SAS/ACCESS(R) 9.3 for Relational Databases: Reference, Second Edition, provided by inventor in Main Idea of Disclosure dated May 6, 2014, <http://support.sas.com/documentation/cdl/en/acreldb/65247/HTML/default/viewer.htm#n013f2u10f81san1fegz77ahf8gk.htm>, 4 pages.

Bendel et al., "Distributed System With Accelerator-Created Containers", U.S. Appl. No. 15/001,279, filed Jan. 20, 2016.

Appendix P—List of IBM Patents or Patent Applications Treated as Related, Filed Jan. 28, 2016, 2 pages.

Bohm, Matthias, et al., "Model-Driven Development of Complex and Data-Intensive Integration Processes", MBSDI 2008, Berlin, Germany, Apr. 1-3, 2008, pp. 31-42.

Simitsis, Alkis, "Modeling and Optimization of Extraction-Transformation-Loading (ETL) Processes in Data Warehouse Environments", National Technical University of Athens, School of Electrical and Computer Engineering, Division of Computer Science, Athens, Greece, Oct. 2004, 202 pages.

* cited by examiner

DISTRIBUTED SYSTEM WITH ACCELERATOR AND CATALOG

BACKGROUND

The present invention relates to data processing in distributed systems, and, more specifically, to processing data in a distributed system that manages data and at least one complete or partial copy of the data.

Heterogeneous, distributed data is commonly stored and analyzed in federated database systems. A federated database system is a type of distributed data processing system, also referred to as "meta-database management system," which transparently maps multiple autonomous database systems into a single federated database. The constituent databases are interconnected via a computer network and may be geographically decentralized. Because the constituent database systems remain autonomous, a federated database system is a contrastable alternative to the (sometimes daunting) task of merging several disparate databases. A federated database is a composite of all constituent databases in the federated database system. Typically, each constituent database of the federated database system maintains its respective interface for receiving database queries. Typically, each constituent database system stores and autonomously maintains a catalog being descriptive of the tables of the respective constituent database. Typically, there is no unified, central schema that encompasses the information available from the members of the federation.

In currently conventional federated database management systems there is no actual data integration in the constituent disparate databases as a result of data federation. In case it should be necessary to integrate and synchronize at least parts of the data stored in different constituent database management systems of a federated database system, additional protocols are typically implemented for synchronizing the data for example (for example, "two-phase commit protocols (2PC)" or "three-phase commit protocols (3PC)").

SUMMARY

According to an aspect of the present invention, there is a method, computer program product and/or system for use with a federated database system including an accelerator system, a database management system (DBMS) structured and programmed to manage a first constituent database, with the DBMS including a single interface structured and programmed to receive database queries. The method, computer program product and/or computer system perform the following operations (not necessarily in the following order): (i) maintaining, by the DBMS, a catalogue comprising first metadata and second metadata, the first metadata being descriptive of a structure of data containers of a first data container type stored in the first constituent database, the second metadata being descriptive of a structure of data containers of a second data container type stored in the accelerator system; (ii) evaluating, by the single interface, a first received database query to determine whether the first database query includes a data definition language statement related to the creation or modification of a first data container in the DBMS; (iii) on condition that the evaluation determines that the first database query includes a data definition language statement related to the creation or modification of the first data container type: (a) providing, by the single interface, the data definition language statement to the database management system, and (b) changing, by the DBMS, the first data container type according to the data definition language statement; and (iv) on condition that the evaluation determines that the first database query includes a data definition language statement related to the creation or modification of the first data container type: (a) providing, by the single interface, the data definition language statement to the database management system, and (b) creating, by the DBMS, a trigger signal that causes the accelerator system to change the second data container type and update the second metadata in the catalogue such that the updated second metadata is descriptive of the changed second data container type.

According to a further aspect of the present invention, there is a method, computer program product and/or system for use with a federated database system including a database management system (DBMS) structured and programmed to manage a first constituent database that stores data in data containers of a first data container type, with the DBMS including a single interface structured and programmed to receive database queries, with the federated database system further including an accelerator system that stores database data in data containers of a second data container type. The method, computer program product and/or computer system perform the following operations (not necessarily in the following order): (i) receiving, by the accelerator system and dispatched from the DBMS, a data manipulation language statement that was included in a first received database query; (ii) receiving, by the accelerator system and from the DBMS, a first trigger signal; (iii) responsive to receipt of the first trigger signal; (iv) changing, by the accelerator system, the second data container type to which the data manipulation language statement relates in the accelerator system; (v) updating, by the accelerator system, the second metadata in a catalogue such that the updated second metadata is descriptive of the changed second data container type; and (vi) responsive to dispatch of the database manipulation language statement, processing, by the accelerator system, the dispatched data manipulation language statement on data contained in instances of data containers of the second data container type stored in the accelerator system.

According to a further aspect of the present invention, a federated database system includes: an accelerator system; and a database management system (DBMS) structured and programmed to manage a first constituent database, with the DBMS including a single interface structured and programmed to receive database queries. The DBMS is structured and programmed to: (i) maintain a catalogue comprising first metadata and second metadata, the first metadata being descriptive of a structure of data containers of a first data container type stored in the first constituent database, the second metadata being descriptive of a structure of data containers of a second data container type stored in the accelerator system, (ii) evaluate, by the single interface, a first received database query to determine whether the first database query includes a data definition language statement related to the creation or modification of a first data container in the DBMS and/or a data definition language statement related to the creation or modification of a first data container in the DBMS, (iii) on condition that the evaluation determines that the first database query includes a data definition language statement related to the creation or modification of the first data container type: (a) provide, by the single interface, the data definition language statement to the database management system, and (b) change the first data container type according to the data definition language statement, and (iv) on condition that the evaluation determines that the first database query includes a data definition language statement related to the creation or modification of the first data container type: (a) provide, by the single interface, the data definition language statement to the database management system, and (b) create, by the DBMS, a trigger signal that causes the accelerator system to change the second data container type and update the second metadata in the catalogue such that the updated second metadata is descriptive of the changed second data container type. The accelerator system is structured and programmed to: (i) receive a data manipulation language statement, dispatched from the DBMS, that was included in the first received database query, (ii) receive, from the DBMS, a first trigger signal, (iii) responsive to receipt of the first trigger signal: (a) change the second data container type to which the data manipulation language statement relates in the accelerator system, and (b) update the second metadata in a catalogue such that the updated second metadata is descriptive of the changed second data container type, and (iv) responsive to dispatch of the database manipulation language statement, process the dispatched data manipulation language statement on data contained in instances of data containers of the second data container type stored in the accelerator system.

BRIEF DESCRIPTION OF THE DRAWINGS

In the following embodiments of the invention are explained in greater detail, by way of example only, making reference to the drawings in which.

DETAILED DESCRIPTION

Figure 1:
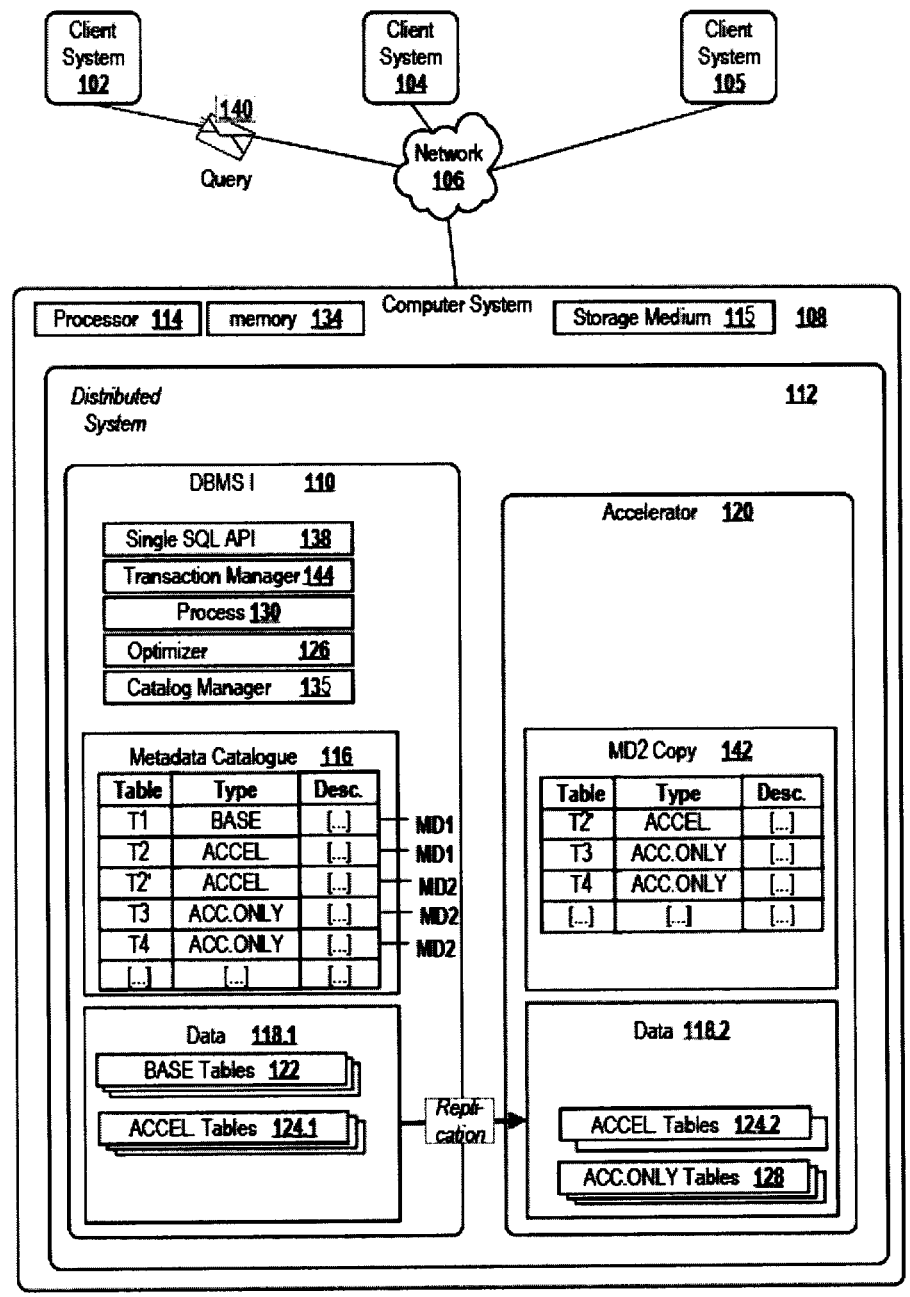
FIG. 1 depicts a distributed system according to an embodiment of the present invention.

Some embodiments of the present invention may recognize one, or more, of the following disadvantages, drawbacks, or areas for potential improvement with respect to conventional federated database system that implement additional protocols for synchronizing data: (i) the additional protocols are typically computationally expensive; (ii) the additional protocols may result in blocking of large parts of the data during synchronization; and/or (iii) multiple constituent database management systems have to be maintained independently.

Some embodiments of the present invention provide for an improved computer-implemented method and computer program product for processing data in a distributed system and a corresponding distributed system. Embodiments of the present invention can be freely combined with each other if they are not mutually exclusive.

Some embodiments of the present invention are directed to a computer-implemented method for processing data in a distributed system. The distributed system comprises at least a first database management system and an accelerator system. The first database management system manages first-database data (sometimes herein more simply referred to as "data"). The accelerator system comprises a copy of at least some parts of the data.

One embodiment of a method according to the present invention includes the operations (not necessarily in the following order) respectively described in the following paragraphs.

OPERATION (1): maintaining, by the first database management system, a catalogue. The catalogue comprises first and second metadata. The first metadata is descriptive of the structure of first data containers stored in the first database management system. The second metadata is descriptive of the structure of second data containers stored in the accelerator system.

OPERATION (2): providing, by the distributed system, a single interface for receiving a database query. The single interface is capable of accessing the catalogue. The accelerator system is configured for processing database queries and to process only queries received by the distributed system via the single interface (and not from other sources).

OPERATION (3): evaluating, by the single interface, the received database query.

OPERATION (4): if the evaluation of operation (3) determines that the received database query comprises a data definition language statement related to the creation or modification of a first data container in the first database management system, then: (i) the single interface provides the data definition language statement to the first database management system; and (ii) the first database management system processes the data definition language statement to create and/or modify the first data container according to the data definition language statement.

OPERATION (5): if the evaluation of operation (3) determines that the received database query comprises a data definition language statement related to the creation or modification of a second data container in the accelerator system, then: (i) the single interface provides the data definition language statement to the first database management system; and (ii) the first database management system processes the data definition language statement to create a trigger signal.

OPERATION (6): if the evaluation of operation (3) determines that the received database query comprises a data manipulation language statement, then the single interface determines the whether the data manipulation language statement will be processed by the first database management system or will be dispatched to the accelerator system for being processed.

OPERATION (7): in response to the generation of the trigger signal at operation (5), then the accelerator system: (i) creates, deletes or updates the second data container to which the data definition language statement relates in the accelerator system; and (ii) updates the second metadata in the catalogue such that the updated second metadata is descriptive of the created, deleted or updated second data container.

OPERATION (8): if the data manipulation language statement is dispatched to the accelerator system at operation (6), then the accelerator system processes the dispatched data manipulation language statement on data contained in the second data containers.

In some embodiments, the catalogue of the first database management system acts as a central repository for data being descriptive of the structure of the data containers of the first database management system and of the accelerator system. In some embodiments a single interface determines whether a particular statement should be provided to and be executed by the first database management system (which maintains the catalog) or should be dispatched to and executed by the accelerator system. In this way, it may be ensured that the database statements of the received query may, in principle, be executed on any first or second data container available both in the first database management system and in the accelerator system. In some embodiments, computational overhead for redundantly storing metadata for example (for example, for redundantly storing first metadata in addition on the side of the accelerator system) can be avoided, because the single interface which evaluates any database query is "aware" of the information of the catalogue. Thus, data manipulation language statements may be dispatched such that they are processed efficiently. The accelerator system may be prohibited from processing data definition language statements received directly from a client to ensure the single interface and the central catalogue maintained by first DBMS (database management system) act as a central instance to maintain the first and second metadata. In some embodiments, a distributed, heterogeneous system includes a data management system and one or more accelerator systems (being respectively adapted to quickly process copies of the data for one or more particular computational tasks) so that less computational overhead is required for maintaining metadata of the constituent database systems.

In some embodiments, a computer program product is used to process data in a distributed system. In some embodiments, the computer program product comprises a computer readable storage medium having program instructions embodied therewith, the program instructions executable by a processor to cause the processor to execute the method according to any one of the embodiments described herein.

In some embodiments, a distributed computer system includes at least a first database management system, an accelerator system and a single interface for receiving a database query. In some embodiments, the first database management system comprises data and a catalogue. In some embodiments, the accelerator system comprises a copy of at least some parts of the data. In some embodiments, the accelerator system is configured for processing database queries and to process only queries received by the distributed system via the single interface. In some embodiments, the single interface is configured for evaluating the received database query in order to decide if database statements contained in the query should be: (i) provided to the first database management system for being processed, or, alternatively, (ii) dispatched to the accelerator system.

In some embodiments: (i) the first database management system comprises a catalogue manager module 135 configured for maintaining the catalogue; (ii) the catalogue comprises first and second metadata; (iii) the first metadata is descriptive of the structure of first data containers stored in the first database management system; and (iv) the second metadata is descriptive of the structure of second data containers stored in the accelerator system.

One embodiment of a method according to the present invention includes the following operations (not necessarily in the following order): (i) evaluating the received database query; (ii) if the evaluation determines that the received database query comprises a data definition language statement related to the creation or modification of a first data container in the first database management system, then providing the data definition language statement to the first database management system; and (iii) if the evaluation returns that the received database query comprises a data manipulation language statement, determining if the data manipulation language statement shall be processed by the first database management system or shall be dispatched to the accelerator system for being processed. In this embodiment, the first database management system is configured for: (i) processing the provided data definition language statement related to the creation or modification of the first data container, thereby creating or modifying the first data container according to the data definition language statement; and (ii) processing the provided data definition language statement related to the creation or modification of the second data container, thereby generating a trigger signal for triggering the accelerator system to create, delete or update the second data container according to the data definition language statement. In this embodiment, the accelerator system is configured for: (i) creating, updating or deleting, in response to the generation of the trigger signal, the second data container to which the data definition language statement relates in the accelerator system (more specifically, the second data container is created or updated in accordance with the data definition language); (ii) updating the second metadata in the catalogue such that the updated second metadata is descriptive of the created, deleted or updated second data container; and (iii) processing the dispatched data manipulation language statement on data (see FIG. 1 at reference numeral 118.2) contained in the second data containers if the data manipulation language statement is dispatched to the accelerator system.

In some embodiments, the accelerator system is a second database management system, the second database management system is configured for processing database queries and to process only database queries received from the first database management system.

In some embodiments, different types of database management systems may be combined. For example, the first database management system may be optimized for efficiently processing database queries of a first type for example (for example, OLTP ("online transaction processing") queries), while the second database management system may be optimized for efficiently processing database queries of a second type (for example, OLAP ("online analytical processing") queries). Thus, technologies optimized for different kinds of workload may be combined, thereby keeping data processing in the constituent systems separate.

According to some embodiments, any database management system (now known or to be developed in the future) may be used as the accelerator system. It merely has to be ensured that the accelerator system is not able to receive and/or process database statements directly from a client (at least not data definition statements and UPDATE, INSERT or DELETE data manipulation language statements), but only from the single interface which may be part of the first database management system. In addition, it should be ensured that the accelerator system updates the second metadata of the catalog of the first database management system upon any change in the structure of a second data container.

According to alternative embodiments, the accelerator system is a data processing module that is interoperatively coupled to the first database management system. The data processing module is configured for solely processing database queries received from the first database management system. The module may be specially adapted for interoperating with a particular first database management system. This may be helpful because the data processing module may be specially adapted to the first database management system and may thus be able to exchange data with the first database management system more efficiently. In addition, it may allow an installation of the first database management system and the accelerator system in a single installation step or may allow the supplementing of the first database management system with a plug-in, the plug-in being the accelerator system, at a later moment in time.

FIG. 1 shows a distributed system according to an embodiment of the invention. As shown in FIG. 1, computer system 108 includes distributed system 112; processor 114; storage medium 115; and memory 134. Distributed system 112 comprises at least a first database management system (DBMS) (also herein referred to as "DBMSI") 110 and an accelerator system (sometimes herein referred to more simply as "accelerator") 120. The first DBMS comprises data 118.1. The accelerator system comprises an ACCELERATOR tables (sometimes herein referred to as "second data container") 124.2, which is a copy of at least some parts 124.1 of the data 118.1.

The distributed system further comprises a single interface (sometimes herein referred to as "single SQL API") 138 for receiving a database query 140. For example, the database query may be received from a client system (also sometimes herein referred to as "clients") 102, 104, 105 via a network 106, for example the internet. At least the accelerator system is "configured for solely processing database queries received by the distributed system 112 via the single interface." (Note: as used herein, the phrase "configured for solely processing database queries received by the distributed system 112 via the single interface" means that the configuration only allows queries to be received from and/or through the single interface; this language does not necessarily mean that the configured component, or module, has no functionality beyond processing database queries.) The single interface is configured for evaluating the received database query 140 in order to determine if the query comprises a data manipulation language (DML) statement or a data definition language (DDL) statement and to determine, for any particular data manipulation language statement, if the statement should be provided to the first database management system for processing or should be dispatched to the accelerator system for processing.

According to some embodiments, the single interface is an integral part of the first database management system. For example, the single interface could be the SQL (structured query language) interface of the first database management system.

According to alternative embodiments, the single interface is a separate program module that may be hosted on the same or a different computer than the first database management system and/or than the accelerator system. In this case, the step of providing a database statement to the first database management system comprises a step of dispatching the database statement to the first database management system, for example via a network. In any case, the single interface has at least read access to the catalogue (sometimes herein referred to as "metadata catalog") 116 in order to evaluate the catalogue and for determining if a particular statement is directed at a first or a second data container.

The first database management system may comprise a catalogue manager module configured for maintaining a catalogue 116. The catalogue comprises first metadata MD1 and second metadata MD2. The first metadata is descriptive of the structure of first data containers (sometimes herein referred to as "BASE tables") 122 and first data containers (sometimes herein referred to as "ACCELERATOR tables") 124.1 stored in the first database management system. The second metadata is descriptive of the structure of second data containers 124.2, 128 (second data container 128 is sometimes herein referred to as ACCELERATOR ONLY tables") stored in the accelerator system.

The first database management system comprises a processing module (sometimes herein referred to as "process" or "process/dispatch") 130 configured for processing the database queries that were provided by the single interface. If the evaluation returns that the received database query comprises a data definition language statement related to the creation or modification of a first data container in the first database management system, the single interface provides the data definition language statement to the first database management system. The first database management system processes the provided statement, thereby creating or modifying the first data container according to the data definition language statement. If the evaluation returns that the received database query comprises a data definition language statement related to the creation or modification of a second data container in the accelerator system, the single interface provides the data definition language statement to the first database management system. The first database management system processes the statement, thereby generating a trigger signal. If the evaluation returns that the received database query comprises a data manipulation language statement, the single interface determines if the data manipulation language statement shall be processed by the first database management system or shall be dispatched to the accelerator system for being processed. This decision can be based, for example, on an evaluation of container type labels assigned to the first or second metadata of respective data containers. For example, the generation of the trigger signal may be the act of forwarding the data definition statement from the first database management system to the accelerator system. The generation of the trigger signal may comprise translating the data definition language statement into the syntax of the accelerator system and forwarding the translated statement to the accelerator. Alternatively, the generation of the trigger signal may be a call of a Create table statement by the first database management system, the call being executed by the accelerator system. For example, the translated DDL statement can be transferred from the first DBMS to the accelerator system using database architecture for a relational database that is implemented in a distributed manner.

The accelerator system is configured for creating, updating or deleting, in response to the generation of the trigger signal, the second data container to which the data definition language statement relates in the accelerator system in accordance with the data definition language statement. Thus, the structure of the second data containers may be modified, for example table columns or constraints added, deleted, renamed or otherwise modified. In addition, the accelerator system is configured for updating the second metadata MD2 in the catalogue 116 such that the updated second metadata is descriptive of the created, deleted or updated second data container. For example, the accelerator system may send a message or execute a callback operation to notify the first database management system of a successful execution of the create, delete or update operation.

In addition, the accelerator system is configured for processing the dispatched data manipulation language statement on data copy (sometimes herein referred to as "data") 118.2 contained in the second data containers if the data manipulation language statement is dispatched by the single interface to the accelerator system.

According to embodiments, the accelerator system 120 is a second database management system. The second database management system is configured for solely processing database queries received from the first database management system. For example, the second DBMS may lack an SQL interface for directly receiving database queries from any one of the client systems, or the SQL interface may be hidden, may not be reachable from external network or be otherwise protected from being accessed from outside the distributed system 112.

According to alternative embodiments, the accelerator system is a data processing application or module that is interoperatively coupled to the first DBMS. The data processing application or module is configured for solely processing database queries received from the first database management system. For example, the accelerator system may be an extension to the first DBMS. For example, DB2 for z/OS may be used as the first DBMS and IBM DB2 Analytics Accelerator IDAA for DB2 or z/OS may be used as the accelerator system. The accelerator system may lack an SQL interface for directly receiving database queries from any one of the client systems. Likewise, the interface may be hidden, kept secret or be otherwise protected from being reached from outside the system 112.

According to some embodiments, the first DBMS may also be configured for solely processing database queries having been received via the single interface.

According to embodiments, the database interface of the first DBMS is used as the single interface of the distributed system. This may have the advantage that no extra interface has to be implemented on top of an existing database interface. Rather, an existing database interface of the first DBMS which also maintains the metadata catalog is used as the single interface for database queries submitted to the distributed system.

Thus, a client does not have to take into consideration if the data requested in a query is retrieved by the first DBMS from a first data container or by the accelerator system from a second data container or from a combination of first and second data containers. For example, the single interface may be configured to decompose the query into subqueries, that is, individual database statements, for deciding if a particular statement should be dispatched to the accelerator system or not. In embodiments where the first DBMS employs a different database query language than the accelerator system, the single interface and/or a component of the first DBMS may selectively translate the dispatched statement into the query language of the accelerator system.

According to some embodiments, the distributed system 112 comprises two or more accelerator systems 120, each accelerator system being configured for efficiently retrieving data for a particular computational task. A computational task may relate, for example, to an analytical task such as supervised or un-supervised learning, data clustering, model generation, or to any other data processing task, for example data transformation via extract-transform-load (ETL) jobs, or the like.

For example, the first DBMS may be an online transactional processing (OLTP) DBMS and the accelerator system may be an online analytical processing (OLAP) DBMS. The single interface, alone or in interoperation with an optimizer module of the first DBMS, may be configured to identify and selectively dispatch OLAP-type read DML statements to the accelerator system. The first DBMS may be optimized for a high number of concurrent read or write DML transactions and short-running transactions (OLTP workload). The accelerator system may be optimized for complex and/or long-running read-only DML queries.

Figure 3:
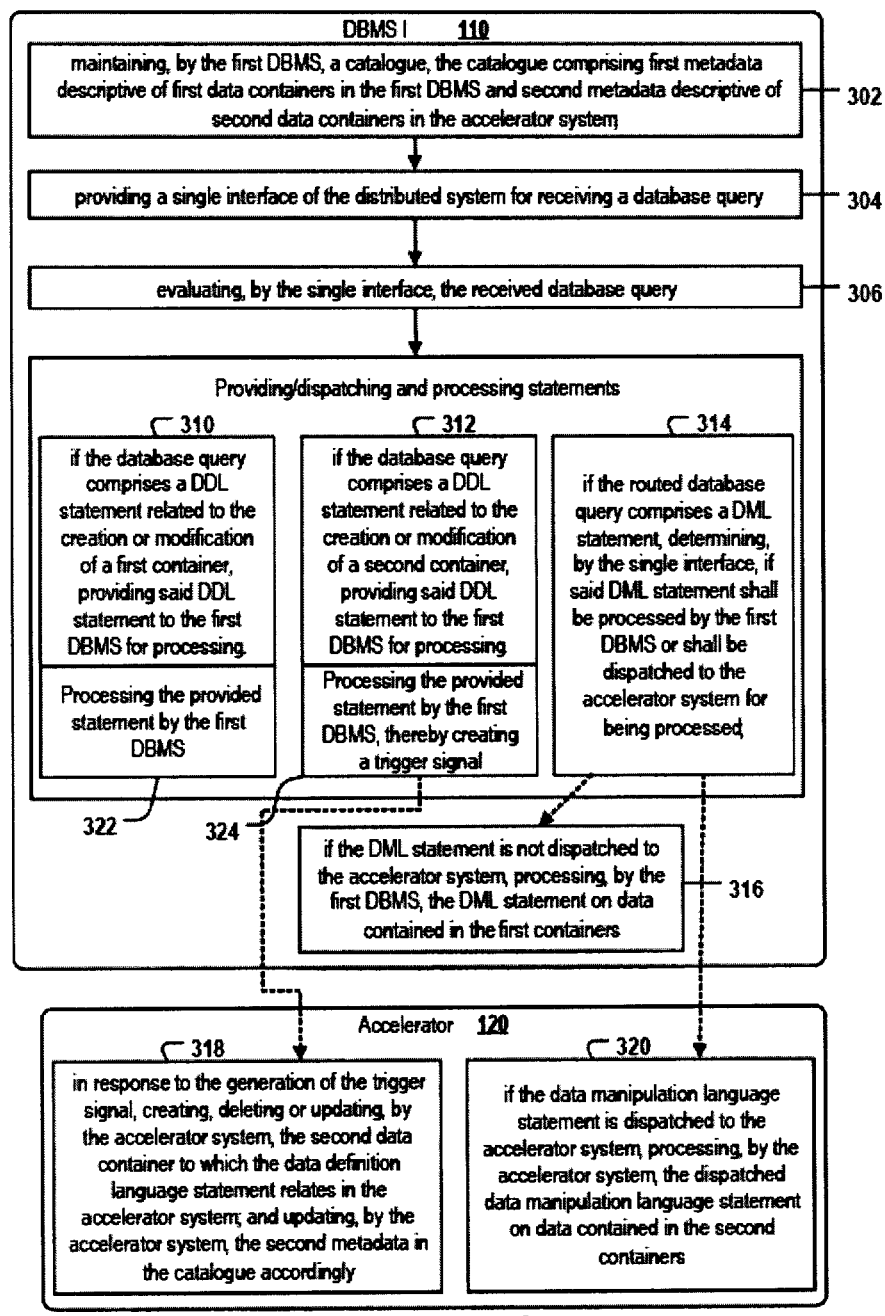
FIG. 3 depicts a flowchart of a method according to another embodiment.

FIG. 3 shows a flow-chart of a computer-implemented method for processing data 118 in a distributed system 112 according to embodiments of the invention. The method will be described in the following by making reference to the embodiment depicted in FIG. 1. The distributed system comprises at least a first DBMS 110 and an accelerator system 120. In some embodiments, the distributed system may comprise further accelerator system, whereby the metadata of data containers of the further accelerator system is also maintained in the catalog of the first DBMS. The first DBMS 110 comprises data 118.1 and the accelerator system comprises a copy 124.2 of at least some parts (see ACCELERATOR tables 124.1 of the data 118.1). The method comprises:

a step 302 of maintaining, by the first database management system, a catalogue 116. The catalogue comprises first metadata MD1 and second metadata MD2. The first metadata is descriptive of the structure of first data containers 122, 124.1 stored in the first DBMS. The second metadata is descriptive of the structure of second data containers 124.2, 128 stored in the accelerator system.

a step 304 of providing, by the distributed system 112, a single interface 138 for receiving a database query 140; the single interface has access to the catalogue; at least the accelerator system is configured for solely processing database queries received by the distributed system 112 via the single interface;

a step 306 of evaluating, by the single interface, the received database query 140 for determining, for each individual database statement in the received query, if the statement is a DDL statement or a DML statement.

If the database query comprises a data definition language statement related to the creation or modification of a first data container in the first database management system, the single interface in step 310 provides the data definition language statement to the first database management system for processing. The first database management system processes the provided statement in step 322 and thereby creates or modifies the first data container according to the provided data definition language statement.

If the received database query comprises a data definition language statement related to the creation or modification of a second data container in the accelerator system, the single interface in step 312 provides the data definition language statement to the first DBMS for processing. The first DBMS processes in step 324 the database statement and thereby creates a trigger signal. The trigger signal is configured for triggering the accelerator system to create, delete or update the second data container according to the data definition language statement. For example, the trigger signal may be an act of forwarding a CREATE TABLE statement specified in the syntax of the accelerator system from the first DBMS to the accelerator system.

If the received database query comprises a data manipulation language statement, the single interface in step 314 determines if the data manipulation language statement shall be processed by the first database management system (see FIG. 3 at step 316) or shall be dispatched to the accelerator system for being processed.

In response to the generation of the trigger signal, the accelerator system in step 318 creates, deletes or updates the second data container to which the data definition language statement relates in the accelerator system. In addition, the accelerator system updates the second metadata MD2 in the catalogue 116 such that the updated second metadata is descriptive of the created, deleted or updated second data container. For example, it may be descriptive of the column names, data types or constraints of the created data container.

If the data manipulation language statement is dispatched to the accelerator system, the accelerator system in step 320 processes the dispatched data manipulation language statement on data 118.2 contained in the second data containers.

According to some embodiments, the accelerator system maintains a copy of the second metadata. In this case, the first DBMS may forward the data definition statement (DDL) to the accelerator system for enabling the accelerator system to create a local copy (sometimes herein referred to as "MD2 copy") 142 of the second metadata. As a result, the accelerator system may update the catalogue 116 of the first DBMS and may update a local copy of the second metadata such that the updated second metadata in the catalog 116 and in the local second metadata copy is descriptive of the created, deleted or updated second data container. Using a local copy of the second metadata in the accelerator system may have the benefit of reducing the data traffic between the first DBMS and the accelerator system in scenarios where the accelerator system has to frequently access and evaluate the second metadata in order to plan and perform the execution of (complex) database queries on the second data containers, because the accelerator system may access a local copy instead of the second data in the catalogue 116 maintained by the first DBMS.

According to embodiments, the copy 124.2 of at least some parts (see ACELERATOR tables 124.1) of the data is regularly updated to synchronize the copy in the accelerator system with the respective parts of the data in the first DBMS. For example, the data in the second data containers 124.2 may be created by means of a snapshot technique or by means of a synchronization technique, for example a "trickle feed update" or "incremental update" technique. The second data container comprising the copy of the data may have a different structure than the first data containers having stored the original data. This may have the beneficial effect of allowing optimizing the structure of the first data containers and of the second data containers for quick data retrieval by different database queries, for example optimizing the first data containers for OLTP queries and the second data containers for OLAP queries. The data copy may be updated in response to a receiving of a database query directed at the particular data or may be performed automatically on a regular basis.

According to some embodiments, the determining if the data manipulation language statement shall be processed by the first database management system or shall be dispatched to the accelerator system for being processed comprises selectively dispatching read data manipulation language (DML) statements to the accelerator system and/or selectively providing write DML statements to the first DBMS for execution.

This may be beneficial especially in heterogeneous distributed systems which comprise a first DBMS that is optimized for efficiently processing database queries of a first type, for example OLTP queries comprising INSERT, UPDATE or DELETE DML statements, which comprise an accelerator system that is optimized for efficiently processing database queries of a second type, for example OLAP queries comprising SELECT DML statements, and wherein all or almost all database queries submitted to the single interface are queries of the second type.

According to embodiments, the single interface 138 is configured to evaluate and interpret a modified SQL statement syntax. The modified SQL syntax enables a client to specify if a data container shall be created as a first data container in the first DBMS or shall be created as a second data container in a particular accelerator system contained in the distributed system. For example, a distributed system may comprise a first DBMS and 20 accelerator systems named "accelerator_system_1" to "accelerator_system_20". The client may submit a query "CREATE TABLE new_table (id INTEGER NOT NULL PRIMARY KEY, name VARCHAR (100) NOT NULL, comment VARCHAR (2000)) in ACCELERATOR accelerator_system_13". The first DBMS will create a second data container with an "id" column and a "comment" column in the accelerator system having assigned the name "accelerator_system_13".

According to embodiments, the catalogue comprises, for each of the first and second data containers, a first, second or third container type label. The container type label may be indicative of the type of the data container and may be assigned in the catalogue to the first or second metadata being descriptive of the data container. The first container type label, for example "BASE", indicates that a data container 122 having assigned the label and the data content of the data container are solely stored in the first database management system. Thus, the first container type label may only be assigned to metadata of first data containers. The second container type label, for example "ACCELERATOR ONLY", indicates that a data container 128 having assigned the label and the data content of the data container are solely stored in the accelerator system. Thus, the second container type label may only be assigned to metadata of second data containers. The third container type label, for example "ACCELERATED", indicates that a data container 124.1 having assigned the label and the data content of the data container are stored in the first database management system and are allowed to be stored (and may already have been stored) as a copy 124.2 in the accelerator system.

The above mentioned container type labels may be beneficial as they enable the single interface to dynamically decide if a particular statement directed at a particular data container must be executed in the first DBMS (for example if the metadata of the data container has assigned the first container type label "BASE"), must be executed in the accelerator system (for example if the metadata of the data container has assigned the second container type label "ACCELERATOR ONLY"), or may be executed in the first DBMS or the accelerator system in dependence for example on criteria being indicative of an expected execution time of the statement in the first DBMS or in the accelerator. The execution time may depend on the type of database statement, current hardware characteristics of the first DBMS and/or the accelerator system, the network bandwidth of a network connection between the first DBMS and the accelerator system, or the like.

According to embodiments, the data of a first data container can be transferred and updated to a second data container having assigned the third container type label on request, for example on request of a client or of the first DBMS, thereby creating an accelerator-side copy of the data of the first data container. A first data container having assigned the first container type label may be used to store data that is to be updated for example in real-time, for example by transactions to be processed as normal OLTP workload. These features may have advantages for report generation and analysis, as they may enable the accelerator system to work on a stable snapshot of the data. It is also possible that the data of a first data container having assigned the third container type label is replicated to the accelerator in "near real-time", thereby effectively storing data in the first DBMS and as a copy in the accelerator system. For example, all changes done to a first data container having assigned the third container type label "ACCELERATED" might be captured by some system component, for example a daemon supervising all changes done to the first data container. The captured changes may be replicated and applied to a corresponding second data container having assigned the second container type label "ACCELERATED" in real time or near real-time. Alternatively, the second data container may contain a point-in-time copy of the data of the first data container. The point-in-time copy may be updated on a regular basis, for example once a week. The first data container assigned to the second data container contains real-time data. In this scenario, an automated synchronization of the second data container may or may not be executed.

According to some embodiments, the determining if the data manipulation language statement shall be processed by the first database management system comprises:

evaluating, by the single interface, the container type label of all first and second data containers that will be accessed by the data manipulation language statement; for example, the single interface may access the catalogue 116 and evaluate the container type labels of all first and second metadata respectively being descriptive of the first and second data containers;

performing the dispatching of the data manipulation language statement to the accelerator system obligatorily in case the data manipulation language statement will access at least one of the second data containers having assigned the second container type label "ACCELERATOR ONLY" and will not access one of the first data containers having assigned the first container type label "BASE"; and/or performing the data manipulation language statement by the first database management system on the data 118.1 of the first database management system obligatorily in case the data manipulation language statement will access at least one of the first data containers having assigned the first container type label "BASE" and will not access one of the second data containers having assigned the second container type label "ACCELERATOR ONLY"; and/or performing the dispatching of the data manipulation language statement to the accelerator system only in case the data manipulation language statement will access only one or more second data containers respectively having assigned the third container type label "ACCELERATED" and in case the first database management system predicts that the data manipulation language statement will be executed quicker in the accelerator system than in the first database management system.

In addition, or alternatively, the single interface throws an error message in case the identified data manipulation language statement will access at least one of the first data containers having assigned the first container type label (BASE) and will in addition access one of the second data containers having assigned the second container type label ("ACCELERATOR ONLY"). This may reduce data traffic as it may be ensured that the statement is aborted in case it accesses both a container in the first as well as a container in the accelerator system. According to some embodiments, the SQL query syntax supported by the distributed system is restricted with the effect that some SQL statements accessing both a data container labeled with "BASE" and a data container labeled with "ACCELERATOR ONLY" (like a federated JOIN between the two data containers) are rejected with an error message. The SQL query syntax of the distributed system may support other queries like "INSERT FROM SELECT" statements which retrieve data from first data containers labeled as "BASE" containers as well as from second data containers labeled as "ACCELERATOR ONLY" containers. The first interface will provide such "INSERT FROM SELECT" statements to the first DBMS for processing. An example of such a statement would be a statement like "INSERT INTO DBMS1.table2 (column_name(s)) SELECT column_name(s) FROM ACCELERATOR.table1;).

For example, the single interface may evaluate the table names contained in a statement to identify one or more tables acting as first and/or second data containers to be accessed. Then, the first and/or second metadata assigned to the identified by a statement to identify the metadata assigned to the identified data containers. Then, the container type labels assigned to the identified first and/or second metadata are evaluated.

The features may enable a dynamic dispatching of DML database statements in dependence on the type of the data container accessed. This may increase performance, for example by enabling a database designer to create first and/or second data containers whose metadata are labeled with information that allows for an automated dispatching of DML queries such that performance of query execution can be increased and/or such that data traffic for synchronizing the data content of the first DBMS and the accelerator system can be avoided. The features may allow to selectively store some particular containers solely in the first DBMS (for example "BASE" tables) or solely in the accelerator system (for example "ACCELERATOR ONLY" tables) and to dynamically route a statement to the subsystem that comprises the relevant and requested data. This may allow avoiding to store each and every part of the data 118.1 as a copy in the accelerator system, thereby avoiding data traffic and reducing the consumption of storage space. It may also allow avoiding transferring data from the accelerator system to the first DBMS which might not be required there.

For example, data containers whose metadata has assigned the first ("BASE") container type label may comprise only data which is never used during data analytical tasks to be performed on the accelerator system.

Likewise, data containers having assigned the second ("ACCELERATOR ONLY") container type label may be data containers for intermediate results which are generated by the accelerator system while performing a data analysis. The first DBMS may not be optimized for efficiently retrieving intermediate results from such a data container, so data traffic can be reduced. In addition, the second container type label ("ACCELERATOR ONLY") may be assigned to second data containers which are configured for storing data that will—at least usually—not be required by the first DBMS or by a client. For example, a client may be interested in a final result of an analysis, but not necessarily in an intermediate result, so the intermediate result may be stored in a second data container whose second metadata in the catalogue has assigned the second container type label. The intermediate results generated by the accelerator system and stored to such a second data container do not have to be synchronized with the data contained in the first DBMS, and the distributed system does not transfer data from second data containers having assigned the second container type label to the first DBMS.

According to embodiments, the third container type label "ACCELERATED" associated with first metadata of a first data container 124.1 indicates that the data content of the first data container is allowed to be stored (and may already have been stored) as a copy 124.2 a second data container assigned to the first data container. In some embodiments, the third container type label "ACCELERATED" may also be associated with second metadata of a second data container to indicate that the data content of the second data container is a copy a first data container assigned to the second data container. Thus, a first data container whose first metadata has assigned a third container type label may have assigned a second data container configured to receive and store a copy of the data content of the first data container.

According to embodiments, the single interface provides any write DML statement (for example INSERT, UPDATE, DELETE) directed at a data container having assigned the third container type label "ACCELERATED" to the first DBMS. The first DBMS executes the provided write DML statement on the first data container comprising the original data. Any changes imposed by the write DML statement will automatically replicated to a corresponding second data container being assigned to the first data container in the catalogue 166 and being configured to store a copy of the data of the first data container.

If the single interface determines that a received database query comprises a read DML statement (for example a SELECT statement) directed at a data container having assigned the third container type label ("ACCELERATED"), the single interface interoperates with an optimizer module (sometimes herein referred to as "optimizer") 126 of the first DBMS in order to dynamically decide if the read DML statement directed at a data container having assigned the third container type label should be provided to the first DBMS for executing the read DML statement on the first data container or should be dispatched to the accelerator system for executing the read DML statement on the second data container assigned to the first data container and comprising a copy of the data content of the first data container. For example, the optimizer may automatically evaluate the read DML statement and other criteria to dynamically predict if the read DML statement will be processed faster in the accelerator system than in the first DBMS. In case the read DML statement is predicted to be executed faster in the accelerator system, the single interface will dispatch the read DML statement to the accelerator system. Otherwise, the single interface will provide the read DML statement to the first DBMS for execution.

The features may be advantageous as the performance of query execution is increased at least for the read DML statements. An ACCELERATED first data container is still completely owned by the first DBMS, but contrary to the BASE containers, the data content of ACCELERATED first data containers is replicated to the accelerator system and may be stored in a different format there to speed up the execution of read DML statements. As the read DML statements do not impose any changes to the data in the second data containers, complex protocols for synchronizing transaction commit events are not necessary for the type of statements. According to some embodiments, the client application is enabled to override this decision of the single interface.

According to embodiments, the first DBMS or one of its components, for example the optimizer module 126, is configured to dynamically decide if a particular statement should be executed in the first DBMS or in the accelerator system. For example, the single interface may be configured to decompose a query 140 into individual database statements. Then, the single interface decides, for each of the individual statements, if the statement is a DML statement or a DDL statement. In case the statement is a DML statement, and in case the statement is directed at a data container having assigned the third container type label "ACCELERATED", the single interface decides, alone or in interoperation with the first DBMS or a component 126 thereof, if the statement should be dispatched to the accelerator system or not.

The optimizer module 126 may automatically evaluate one or more additional criteria for deciding if a particular read DML statement should be dispatched to the accelerator system or not. For example, the optimizer 126 may predict the execution time of the read DML statement in the first DBMS and in the accelerator system. Some of the criteria may be the type of the database statement (for example OLTP or OLAP) and the type of query for which the first DBMS or the accelerator system is optimized for. According to embodiments, the first DBMS is optimized for processing a particular type of database query while the accelerator system is optimized for a different type of database query. The statement may belong to a particular one of the query types and may be dispatched by the single interface to that one of the sub-systems of the distributed system which is optimized for processing the query type the statement belongs to. In some further examples, the criteria may also comprise hardware characteristics of the IT-infrastructure hosting the first DBMS and the accelerator system. The optimizer may determine current hardware characteristics of the IT-infrastructure hosting the first DBMS and/or the IT-infrastructure hosting the accelerator system, the network bandwidth of a network connection between the first DBMS and the accelerator system, a latency time of replicating data changes from the first DBMS to the accelerator system, or the like. The decision may depend on the predicted statement execution times in the first DMBS and in the accelerator system. The prediction of the execution time by the optimizer may take into consideration the hardware characteristics (CPU load, amount of available memory or storage, etc.). If a particular read DML statement is predicted to be executed in the accelerator system quicker than in the first DBMS, it is dispatched to the accelerator system. Otherwise, it is executed in the first DBMS.

According to embodiments, the first DBMS or a module 130 thereof may be configured for retrieving the results of each statement from the first DBMS and/or from the accelerator system and to merge all received results for computing a complete, final result (see FIG. 2, 204) that is returned to a client 102. This may be beneficial, because a first DBMS and an accelerator system may be speed-optimized for different queries, for example the first DBMS may be optimized for transactional workloads with high update rates and very high transaction rate and the accelerator system may be weak on updates but may be optimized for analytical queries. By dynamically deciding for each kind of statement and by taking into consideration current hardware characteristics, the total time for processing a query may significantly be reduced.

According to some embodiments, the first DBMS is configured for outputting an error message in case a query for processing a "mixed write database transaction" is received via the single interface 138. A "mixed write transaction" comprises database statements performing a write operation, for example an UPDATE, on first data containers and comprises database statements performing a write operation on second data containers. This may have the benefit that complex synchronization and locking operations executed by the first DBMS on the first DBMS and the accelerator system in order to guarantee transactional consistency of the data in the first DBMS and the (partial) data copies in the accelerator system can be avoided, thereby reducing the computational overhead necessary for operating the distributed system.

According to other embodiments, the first DBMS is configured to manage the processing of "mixed read transactions". A "mixed read transaction" comprises database statements performing a read operation, for example a SELECT operation, on first data containers and comprises database statements performing a read operation, for example a SELECT operation, on second data containers. It is also possible that a "mixed read transaction" comprises one or more statements performing either a write operation on first data containers or performing a write operation on second data containers (but not both on first and second data containers) in addition to the read operations. For example, the module 130 may be configured to decompose a transaction specified in query 140 into individual database statements. Then, the first DBMS decides, for each of the individual statements, if the statement is a DML statement or a DDL statement. In case the statement is a DML statement, the first DBMS will execute all DML statements which must access or should access a first data container and will dispatch all DML statements which must access or should access (because they run faster on the accelerator than on the first DBMS) the accelerator system to the accelerator system for execution. The first DBMS may then retrieve the results of each statement from the first DBMS and from the accelerator system and merge all received results for computing a complete, final result (see FIG. 2, 204). This may be beneficial in particular for quickly executing database statements of the following type:

INSERT into a first data container (for example a table in the first DBMS whose first metadata is labeled with "BASE") via SELECT from a second data container (for example a table in the accelerator system whose second metadata is labeled with "ACCELERATOR ONLY");

INSERT into a second data container (for example a table in the accelerator system whose second metadata is labeled with "ACCELERATOR ONLY") via SELECT from a first data container (for example a table in the first DBMS whose first metadata is labeled with "BASE");

SELECT X from a first data container (for example a table in the first DBMS whose first metadata is labeled with "BASE") JOIN SELECT Y from a second data container (for example a table in the accelerator system whose second metadata is labeled with "ACCELERATOR ONLY").

According to embodiments, the determining if a DML statement shall be processed by the first DBMS or shall be dispatched comprises deciding to dispatch every DML statement configured to access one of the second data containers having assigned the second or third container type label to the accelerator system. This may be beneficial as data processing operations may be delegated, whenever possible, to the accelerator system, thereby saving computational resources of the IT environment hosting the first DBMS.

According to embodiments, the first DBMS processes the DML statement on the data 118.1 stored in the first DBMS if the DML statement is not dispatched to the accelerator system.

According to embodiments, the received database query comprises a DDL statement which specifies that a new second data container shall be created in the accelerator system. The updating of the second metadata MD2 in the catalogue 116 comprises storing, by the accelerator system, a definition of the structure of the created new second data container and a container type label ("ACCELERATOR ONLY") in the catalogue. The container type label is a second container type label and indicates that the created container is solely stored in the accelerator system. The newly created second data containers may be used for storing intermediate results generated during a stepwise execution of a computational tasks, for example a data analysis task, in the accelerator system. Preferentially, the stored intermediate results are not transferred to the first DBMS, or only upon an explicit request of the first DBMS. This may be beneficial, because although the intermediate results are not transferred to the first DBMS and although the first DBMS does not comprise a copy of the second data containers having stored the intermediate results, the first DBMS is in full control of the intermediate results and in control of the respective calculation steps as it controls the dispatching of statements and controls the transactional context of the transaction comprising each of the dispatched and non-dispatched statements. A client may access the intermediate results via the single interface 138, because the second metadata of the second data containers allow executing database statements on the intermediate results in the second data containers. This reduces data traffic, because the intermediate results are communicated to the first DBMS only in response to an explicit request.

According to some embodiments, the accelerator system lacks any catalogue comprising metadata being descriptive of the structure of the second data containers 124.2, 128.2.

According to some alternative embodiments, the accelerator system comprises an accelerator catalogue. The accelerator catalogue selectively comprises a copy of the second metadata, the copy being regularly synchronized with the second metadata in the catalogue 116.

According to some embodiments, the method further comprises providing a transaction manager 144. The transaction manager is a component of the distributed system 112. For example, the transaction manager may be a component of the first DBMS or a component external to the first DBMS. The transaction manager is configured to manage begin, commit and rollback events of first, second and third database transactions. The first database transactions respectively comprise one or more database statements, for example DDL and/or DML statements, which are to be processed by the first database management system (for example because they access first data containers labeled with the first container type label "BASE"). The second database transactions respectively comprise one or more database statements, for example DDL or DML statements, which are to be processed by the accelerator system (for example because they access second data containers labeled with the second ("ACCELERATOR ONLY") or third ("ACCELERATED") container type label). The third database transactions respectively comprise at least one database statement, for example a DDL and/or DML statement, which is to be processed by the first database management system and at least one database statement which is to be processed by the accelerator system. Thus, in some embodiments, the transaction manager may act as a single central instance for managing transactions to be executed in the first DBMS and/or in the accelerator system.

Thus, the processing of any dispatched DML statement which access data in second data containers is performed in a transactional context which is managed and maintained by the transaction manager. The transaction manager may act as a single, central transaction manager of the distributed system. The transaction manger is the only master for transactions executed both in the first DBMS and in the accelerator system. In case of an error when processing a statement directed on data of a second data container, the transaction manager may rollback the whole transaction comprising the statement, the statement also including statements which may have been executed on a first data container. For example, in case the transaction manager determines a ROLLBACK event of a transaction that is currently performed in the accelerator system, the transaction manager may instruct the accelerator system to roll back the transaction. So the protocol is under control of the transaction manager. An integral transaction manager of the first DBMS may be used as the transaction manager and the transactions performed in the accelerator system may be under the control of the first DBMS. The distributed system does not allow a two-way communication commit protocol between the first DBMS and the accelerator, thereby avoiding related protocol complexity and computational overhead. For example, the accelerator system may perform several INSERT operations on a second data container having assigned the second container type label "ACCELERATOR ONLY". The accelerator system may receive a ROLLBACK command from the transaction manager, for example because a write operation on a first data container which is part of the transaction failed. As a consequence, the accelerator system aborts the INSERT statements to be executed on the second data containers.

Using only a single component for transaction management both in the first DBMS and in the accelerator system may be beneficial, because no Two-Phase-Commit Protocol (2PC) or Three-Phase-Commit-Protocol (3PC) need to be implemented or executed (as is the case, for example, in federated database systems, in order to keep the data 118.1 and the data copy 118.2 in sync. In a further beneficial aspect, no client system has to care about concurrency control and transaction management to ensure data consistency.

According to embodiments, the accelerator system lacks any transaction management logic or it may merely comprise a disabled transaction management logic which is not used for managing transactions performed on the second data containers. If the accelerator system lacks any transaction management logic, the transaction manager 144 does not send any write DML statements to the accelerator system before the transaction manager determines that the transaction shall be performed in the accelerator system and that no rollback event will be received for the transaction. For example, the transaction manager may receive a signal from a client or from another component of the DBMS indicating that the transaction shall commit. This may be beneficial as complex protocols such as the MVCC (multi version concurrency control) protocols may not be required for ensuring data consistency as the transaction manager may act as a single central manager of transactions to be execute in the first DBMS and in the accelerator.

According to some embodiments, the generation of the trigger signal for triggering the accelerator system to create, delete or update one of the data containers stored in the accelerator system comprises translating, by the first DBMS, the DDL statement into a translated DDL statement and forwarding the translated DDL statement to the accelerator system. The translation may comprise adapting the syntax of the DDL statement to requirements of the accelerator system. The creating, updating or deleting, by the accelerator system, comprises executing the translated DDL statement by the accelerator system. This may be beneficial, as the distributed system may support different SQL dialects. Thus, a plurality of different database management systems and/or accelerator system modules may freely be combined which are respectively optimized for quickly processing different kinds of database queries.

According to some embodiments, the transaction manager 144 creates, for each database transaction comprising at least one database statement which shall be processed by the accelerator system, one or more database connections between the first database management system and the accelerator system. The first database management system uses the created one or more database connection for the dispatching of any one of the statements being contained in the transaction. The transaction manager may close the one or more connections upon a commit event of one of the statements of the transaction for which the one or more connections were created. This may be beneficial as the coupling of the connection management to the transaction management may help to ensure transactional isolation and data consistency.

According to some of the embodiments, the transaction manager creates, for each of the DML statements which shall be dispatched to the accelerator system for being processed, a primary database connection between the first DBMS and the accelerator system.

According to other embodiments, the transaction manager creates, for multiple consecutively received DML statements which shall be dispatched to the accelerator system for being processed and which perform a write operation (for example an INSERT, UPDATE or DELETE operation), a single primary database connection between the first database management system and the accelerator system. In addition, or alternatively, the transaction manager creates, for each of the DML statements which shall be dispatched to the accelerator system for being processed and which perform a read (for example a SELECT) operation, a secondary database connection between the first database management system and the accelerator system. For example, the first DBMS may act as a database client to the accelerator system, the database client being connected to the accelerator system via one or more primary and/or one or more secondary database connections. The primary and the secondary database connections are two types of database connections which are executed according to different chronological schemes: The creating of the primary database connections and the executing of the database statements for which the primary database connections were created are executed sequentially in accordance with the chronological sequence of the statements in a requested transaction. To the contrary, the database statements for which the secondary database connections were created are executed in parallel, thereby using the secondary database connections which are opened and maintained concurrently.

This may have the beneficial effect of increasing the performance of database queries: read (SELECT) statements may be executed in parallel using secondary database connections. Read operations may be executed in parallel without violating transactional consistency, because the read data is not manipulated. To the contrary, begin statements, commit statements and write DML statements of a particular transaction may be communicated and executed via a single primary database connection or a set of sequentially executed primary database connections. Thus, data retrieval may be accelerated and the blocking of DML statements and associated delay times may be prevented.

According to some embodiments, the transaction manager begins a transaction and opens a corresponding primary database connection between the first DBMS and the accelerator system upon receiving a write DML statement that is part of a query. The write DML statement may be, for example, an UPDATE, INSERT or DELETE statement. All succeeding write DML statements which may be received as part of the query or as part of a succeeding query are executed within the transaction by using the one primary database connection. Upon receiving a first read DML statement, the transaction manager triggers the commit of all write DML statements preceding the read statement. After the commit event for the transaction comprising the preceding write DML statements, the primary database connection having been created for the transaction is closed. The received first read DML statement is executed by using a secondary database connection, the secondary database connection being created or provided from a pool of secondary connections by the transaction manager. If the transaction manager receives further read DML statements succeeding the first read DML statement, the further read DML statements are executed in parallel via other secondary database connections created by the transaction manager or provided from a pool of secondary transactions by the transaction manager. If a new write DML statement is received that belongs to the same transaction as the preceding read DML statements, the transaction manager may create a copy of the second data containers to be accessed selectively by read DML statements of the transaction via secondary database connections in parallel.

According to other embodiments, the transaction manager automatically initiates the execution of a transaction in the accelerator system upon processing the first statement in the requested transaction that will access a second data container having assigned a second or third container type label (ACCELERATED or ACCELERATOR ONLY). The particular statement and all succeeding statements are executed in the accelerator system in the same transactional context. The borders of a transactional context are defined by a begin event and a commit or a rollback event. Transactions solely comprising statements directed at first data containers do not trigger the start of a new transaction in the accelerator system. This may have the beneficial effect of reduced network traffic. Nevertheless, the isolation levels SERIALIZABLE and REPEATABLE READ can be provided by this transactional control strategy.

According to other embodiments, the transaction manager automatically initiates the execution of a transaction in the accelerator system when the first statement in the requested transaction is processed which is a write DML statement (INSERT, UPDATE, DELETE). The particular write DML statement and all succeeding statements will be performed as a single transaction in the accelerator system. All preceding read DML statements may run in their own transactional context in the first DBMS. This approach is associated with very low computational overhead for transactional control and delegation, but does not support isolation levels SERIALIZABLE and REPEATABLE READ. However, the isolation levels are usually not required in an analytical system.

According to embodiments, the method comprises creating, by the accelerator system, a copy of a second data container that is currently accessed by a mixture of write DML and read DML statements, the mixture of write and read DML statements belonging to the same transaction. For example, the creating of the copy of the second data container can be triggered by the processing of the first write DML statement of the transaction. The accelerator system executes all write DML statements of the transaction on the original second data container and executes all read DML statements in parallel on the created copy of the second data container ("spill-to-disk"). In some embodiments, read DML statements which have already started when the copy of the second container is created may be finished on the original second data container. The results of the parallel execution of the read DML statement may be communicated, for example, in parallel to the first DBMS via the secondary database connections. Preferentially, the accelerator system deletes the copy of the second data container upon a rollback of the transaction or upon a commit event of the transaction.

Preferentially, the creation and closing of a connection and the starting of performing a transaction in the accelerator system is performed regardless of any database queries received from a client. A query may specify one or more database transactions and each transaction may comprise one or more database statements. The database connections between the first DBMS and the accelerator are opened and closed regardless of whether a particular database statement is at the beginning or end of a query. Rather, for example, a primary database connection is opened for a particular transaction, whereby the transaction manager defines and controls the begin, commit and rollback of the transaction. The primary connection created for the particular transaction is closed when the transaction commits or rolls back. In case a transaction comprises multiple statements distributed in multiple database queries, the transaction manager maintains and reuses the primary connection for performing all the multiple database statements. Thus, not each new query 140 of a client system may trigger the creation of a new data connection. This may reduce computational overhead for transaction and connection management.

According to some embodiments, the first DBMS triggers the accelerator system to create a plurality of second data containers 128 and to update the second metadata of the catalogue 116 such that the second metadata is indicative of the structure of the plurality of second data containers. The first DBMS lacks first data containers being structurally identical to the created plurality of second data containers. The first DBMS coordinates the processing of a plurality of DML statements in the accelerator system, the plurality of data manipulation language statements being processed within a single transaction whose begin and commit moment is controlled by the first DBMS.

The processing of the plurality of DML statements comprises calculating, by the accelerator system, one or more intermediate results for a computational task and calculating a final result for the computational task. Each of the intermediate results is used as input for calculating another one of the intermediate results or for calculating the final result. The processing of the plurality of DML statements further comprises storing, by the accelerator system, at least the one or more intermediate results in a respective one of the created plurality of second data containers 128.2. For example, the second data containers may be generated temporarily for the duration of performing the computational/analytical task.

The first DBMS receives the final result but does not receive any one of the intermediate results from the accelerator system. In some cases, the first DBMS may explicitly request and receive a particular one of the intermediate results from the accelerator system, but the distributed system does not automatically synchronize and transfer the intermediate results generated by the accelerator system to the first DBMS. This may have the beneficial effect that the data traffic between the accelerator system and the first DBMS is reduced, as only the metadata catalog is updated automatically whenever a new second data container is created in the accelerator system, but any new data generated by the accelerator system is not automatically propagated to the first DBMS. The intermediate results may be, for example, intermediate results generated during a multi-step ETL job.

According to embodiments, the method comprises merging, by the first DBMS, the received final result with data (see table T1 of FIG. 2) stored in the first DBMS, and returning a merged result to the client application. In addition or alternatively, the first DBMS stores the merged result in one of the first data containers. This may be beneficial as the client or the first DBMS may receive the final merged result without the necessity that the intermediate results are communicated from the accelerator system to the first DBMS.

According to some embodiments, the plurality of DML statements are stored in the accelerator system in the form of one or more stored procedures. The processing of the dispatched data manipulation language statement by the accelerator system comprises calling the stored procedures for calculating the intermediate results sequentially and for sequentially filling the created plurality of second data containers with the intermediate results.

Figure 2:
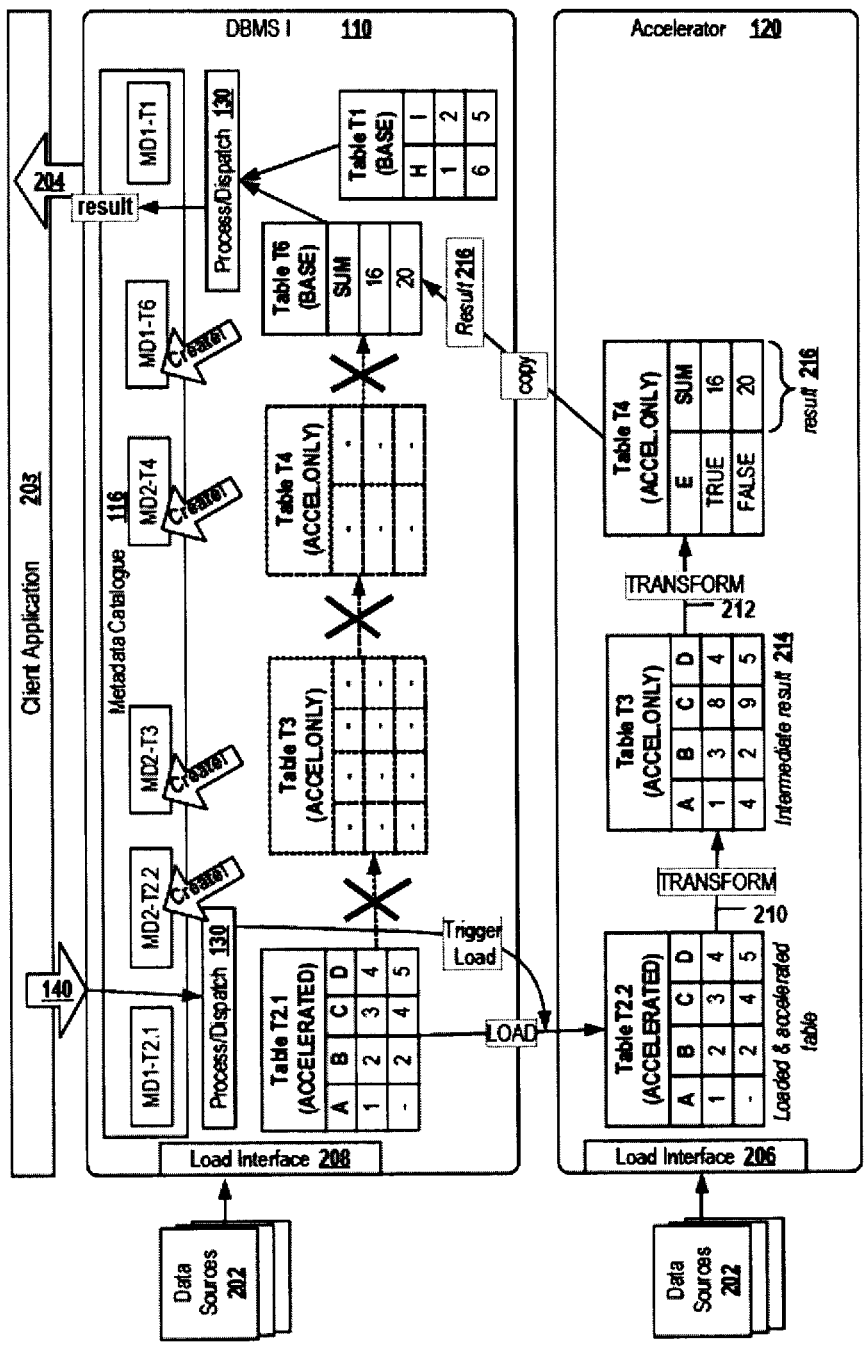
FIG. 2 depicts the dynamic updating of the catalog with second metadata during a multi-step data transformation process executed by the accelerator system according to an embodiment.

FIG. 2 shows the execution of a computational task, in this case, a multistep transformation ("extract-transfer-load" (ETL) job. The distributed system may be connected to one or more external data sources (sometimes herein referred to as "client application") 203, for example external databases, remote web services, loadable files or the like. The first DBMS may comprise a load interface 208 for loading the data from the external data sources 202 to one or more first data containers, for example table T2.1 having assigned the container tape label "ACCELERATED". A second data container, table T2.2, in the accelerator system 120 comprises a copy of the data stored in table T2.1. According to some embodiments, the accelerator system may have a load interface 206 for loading the data into the table T2.2 directly from the data sources 202 or may receive the copy of the data in table T2.1 directly from the first DBMS. The meta-data catalog 116 comprises first metadata MD1-T2.1 for table T2.1 and second metadata MD2-T2.2 for table T2.2.

A client application 203, which may be installed on one of the client systems 102, 104, 105, may submit a database query 140 for retrieving data transformed into a particular format. The client application submits the query via the single interface 138 of the distributed system 112. The single interface does not allow the clients to recognize if and how many accelerator systems are contained in the distributed system.

In response to receiving the database query 140, the first DBMS triggers the accelerator system to transform the data content of table T2.2 in multiple transformation steps 210, 212 into a final transformation result 216. For example, the data content of table T2.2 is transformed in transformation step 210 into an intermediate result 214. The processing module 130 does not only trigger the transformation step 210 but also triggers the creation of table T3 (as a second data container) in the accelerator system. The intermediate results 214 is stored into table T3 and is used as an input for a succeeding transformation step 212 which is also under the control of the processing module 130. When table T3 is created in the accelerator system, the accelerator system automatically updates the catalog 116. As a result, the catalog comprises second meta-data MD2-T3 being descriptive of the name and structure of table T3 and enabling the processing module 130 to control database queries which are directed on the intermediate results 214. The intermediate results 214, that is, the data content of table may only be returned to the first DBMS in response to an explicit request. Thus, the transferring of intermediate results can be omitted completely in many cases. In addition, the processing module 130 triggers the accelerator system to create a table T4 in the accelerator system, to update the catalog 116 with corresponding second metadata MD2-T4 and to store the intermediate result generated by transformation step 212 as a final result 216 in table T4. The result 216 is requested by the processing module 130 and may be merged with additional data which may be derived from one or more first data containers, for example from table T1. The merged final result (sometimes herein referred to more simply as "result") 204 is returned by the processing module 130 to the client application 203. The processing module may interoperate with the single interface for executing the control on the dispatched statements and the generation of the intermediate results and for receiving and merging the result.

For example, a DML statement or a query, like INSERT INTO <DBMS1_tableT6> SELECT FROM <ACCELSYSTEM_tableT7> makes use of a table T6 stored in the first DBMS and a table T4 stored in the accelerator system. The first DBMS coordinates the processing of the parts that need to be done in the accelerator system and then processes the received result 216 further. Thus, the first DBMS is configured to control the transformation steps processed in the accelerator system, to interpret any error codes thrown by the accelerator system during transformation, and to merge the results.

The individual transformation steps 210, 212 are solely performed in the accelerator system, not in the first DBMS, because the accelerator system and the structure of its second data containers may be optimized for quickly performing ETL jobs while the first DBMS and the structure of its first data containers may be optimized for different computational tasks. Per default, the intermediate results are not communicated to the first DBMS. Nevertheless, as the first DBMS has access to and is in control of the meta-data of the first as well as of the second data containers and as all DDL and DML statements are forwarded to the first DBMS, the DBMS is in full control over the whole transformation process, may stop and roll back a transformation if an error occurs on the accelerator site or in the first DBMS, and may thus ensure data consistency without having to implement complex synchronization protocols.

That table T3 and table T4 do not exist in the first DBMS is indicated by the dotted table lines of T3 and T4 in the first DBMS 110.

A "data container" as used herein is a data structure used as a data container for storing data in a structured manner. A data container may be a database table. According to some embodiments, the first and second data containers may be database tables or database views or files managed by a DBMS or an accelerator system or a mixture thereof.

"Metadata" as used herein is data that is descriptive of some features of a data container, but is not descriptive of the data that is stored in the container. For example, metadata may comprise a name such as "employee", "ID", "salary" of a data container or namespace of a data container. A namespace is a prefix, for example "employee_"

that is reserved for a set of containers having a name staring with the prefix, for example "employee_1", "employee_2", . . . "employee_35". The metadata may comprise an indication of the number and names of the columns of a table or view and may comprise constraints of the container or individual columns of the container, for example unique constraints, foreign key constraints, default values for particular columns, a specification of the type or maximal size of data to be stored in a particular column, or the like.

A "database" as used herein is an information structure, which comprises one or more data containers, the use of which is controlled by a database management system. The database may be a relational database, an object oriented database, or any other kind of database. Accordingly, the DBMS may be a relational DBMS, an object oriented DBMS, an OLAP DBMS, an OLTP DBMS, or any other kind of DBMS. A DBMS may be optimized for performing a particular kind of database query, for example OLTP queries or OLAP queries, quickly.

A "database management system" (DBMS) is a system designed to allow the definition, creation, querying, update, and administration of a database.

An "accelerator system" as used herein is a system designed to allow the querying of data managed by the accelerator system in a particularly fast manner. An accelerator system may be a conventional DBMS coupled to another DBMS or may be a module or plug-in that needs to be operatively coupled to another DBMS in order to be operable to function, for example, to analyze data. The module or plug-in does not provide for a complete DBMS on its own. When coupled to the other DBMS, for example a "first DBMS", the accelerator system is configured to act as an "accelerator", because it is capable of processing at least some kinds of database queries quicker than the other DBMS.

For example, an accelerator system may take the form of an asymmetric massively parallel processor (AMPP) appliance with a database "façade" on its front end, whereby only the first DBMS may be allowed to access the "façade". Except from the database-like façade that is visible only to the first DBMS, the accelerator system may be organized internally completely different than a conventional DBMS. However, it is also possible that it is organized like a conventional DBMS that hides its SQL interface from outside queries.

A "distributed system" as used herein is a data processing system that may be hosted on one or on multiple different data processing devices which may be connected to each other via a network. The distributed system comprises at least a first DBMS with a catalog, one or more accelerator systems and a single interface for receiving database queries.

A "catalogue" or "database catalogue" as used herein is a component of a database management system that comprises metadata in which definitions of database objects such as base tables, views, synonyms, value ranges, indexes, users, and user groups are stored. According to preferred embodiments, the catalogue is accessible by a uniform SQL standard called the INFORMATION_SCHEMA, but there exist also database-specific metadata access methods, for example for Oracle databases.

A "network" as used herein may be any kind of wireless or wired information network. However, the network is such that it can be implemented to work in a telecommunication system, which is compliant with at least one of the following protocols and/or categories of protocols: TCP/IP, Ethernet, ATM, CDMA, GSM, HSCSD, GPRS, WCDMA, EDGE, Bluetooth, UMTS, WLAN and imode.

A "trigger signal" as used herein is data that is communicated from the first DBMS to the accelerator system for causing the accelerator system to perform an action. For example, a trigger signal may be communicated to the accelerator system in order to trigger the accelerator system to create, delete or update a second data container according to information specified in a data definition language statement which caused the generation of the trigger signal. The trigger signal may be implemented, for example, as a remote procedure call of the first DBMS to the accelerator system. Alternatively, the trigger signal may be an unmodified or modified copy of the DDL statement that is forwarded from the first DBMS to the accelerator system. The modification may relate to adapting the DDL statement to the syntax of the accelerator system.

A "database connection" is a point-to-point data communication channel over data network between a data processing system acting as a client and a system managing a data source. For example, a client system and the first DBMS may be connected by a database connection. According to another example, the first database management system may be connected via one or more database connections to the accelerator system, whereby the first DBMS acts as a client. Once the connection has been established, the client may be enabled for using for example remote procedure calls to process and retrieve some data from the data source.

A "data definition language statement" ("DDL statement") is a database statement defining the structure of data containers of a database, the statement being specified in a formal syntax, for example a syntax used by a DBMS for specifying database schemas. An example for a DDL statement is the CREATE TABLE command ("CREATE TABLE [table name] ([column definitions]) [table parameters]").

A "data manipulation language statement" ("DML statement") is a is a database statement which reads stored data from a database or which stores or modifies stored data in a database, but does not modify the schema or structure of the database or the schema or structure of the data containers of the database. An example for a DML statement is the SELECT command, the UPDATE table command, or the INSERT command ("INSERT INTO table (column1 [, column2, column3 . . . ]) VALUES (value1 [, value2, value3 . . . ])").

"Changing" a data container type definition or substantive data in an instance of a data container is herein defined to include creating, updating, modifying and/or deleting the definition of the data container type and/or substantive data stored in an instance of the database container.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for use with a federated database system including an accelerator system, a database management system (DBMS) structured and programmed to manage a first constituent database, with the DBMS including a single interface structured and programmed to receive database queries, the method comprising:

maintaining, by the DBMS, a catalogue comprising first metadata and second metadata, the first metadata being descriptive of a structure of data containers of a first data container type stored in the first constituent database, the second metadata being descriptive of a structure of data containers of a second data container type stored in the accelerator system;

evaluating, by the single interface, a first received database query to determine whether the first received database query includes a data definition language statement related to a creation or modification of a first data container in the DBMS and/or a data definition language statement related to a creation or modification of a second data container in the accelerator system;

on condition that the evaluation determines that the first received database query includes a data definition language statement related to the creation or modification of the first data container of the first data container type:
providing, by the single interface, the data definition language statement to the database management system, and
changing, by the DBMS, the first data container type according to the data definition language statement; and on condition that the evaluation determines that the first received database query includes a data definition language statement related to the creation or modification of the second data container of the second data container type:
providing, by the single interface, the data definition language statement to the database management system, and
creating, by the DBMS, a trigger signal that causes the accelerator system to change the second data container type and update the second metadata in the catalogue such that the updated second metadata is descriptive of the changed second data container type.

2. The computer-implemented method of claim 1 wherein: the catalogue includes for each of the first and second data container types, a first, second or third container type label; the first container type label indicates that instances of data containers having the first container type label and data content are solely stored in the first constituent database managed by the DBMS; the second container type label indicates that instances of data containers having the second data container type label and data content are solely stored in the accelerator system; and the third container type label indicates that an instance of a data container having the third container type label and data contents are stored in the first constituent database managed by the database management system and are allowed to be stored as a copy in the accelerator system.

3. The computer-implemented method of claim 2 further comprising:
evaluating, by the single interface, the first received database query to determine whether the first received database query includes a data manipulation language statement; and
on condition that the first received database query includes a data manipulation language statement, determining, by the single interface, whether the data manipulation language statement shall be processed by the DBMS or shall be dispatched to the accelerator system for being processed on data contained in containers of the second data container type stored in the accelerator system.

4. The computer-implemented method of claim 3, further comprising: on condition that the single interface determines that the data manipulation language statement shall be processed by the DBMS: evaluating, by the single interface, a container type label of all instances of data containers of the first data container type and all instances of data containers of the second data container type that will be accessed by the data manipulation language statement, and performing the dispatching of the data manipulation language statement to the accelerator system obligatorily in case the data manipulation language statement will access at least one instance of a data container of the second data container type having assigned the second container type label.

5. The computer-implemented method of claim 3, further comprising: on condition that the single interface determines that the data manipulation language statement shall be processed by the DBMS: evaluating, by the single interface, a container type label of all instances of data containers of the first data container type and all instances of data containers of the second data container type that will be accessed by the data manipulation language statement, and performing the data manipulation language statement by the DBMS on data of the first constituent database managed by the database management system obligatorily in case the data manipulation language statement will access at least one of the first data container instances having assigned the first container type label and will not access any instances of data containers of the second data container type having assigned the second container type label.

6. The computer-implemented method of claim 3, further comprising: on condition that the single interface determines that the data manipulation language statement shall be processed by the DBMS: evaluating, by the single interface, a container type label of all instances of data containers of the first data container type and all instances of data containers of the second data container type that will be accessed by the data manipulation language statement, and performing the dispatching of the data manipulation language statement to the accelerator system only on the following conditions: (i) the data manipulation language statement will access at least one instance of a data container of the second data container type having assigned the third container type label, and (ii) the DBMS predicts that the data manipulation language statement will be executed quicker in the accelerator system than in the DBMS.

7. The computer-implemented method of claim 1 wherein: the DBMS is optimized for processing database queries of a first database query type; and the accelerator system is optimized for processing database queries of a second database query type.

8. The computer-implemented method of claim 1, further comprising: managing, beginning, committing and rolling back, by a transaction manager of the federated database system, events of first, second and third database transactions; wherein: the first database transactions respectively comprising one or more database statements to be processed by the DBMS; the second transactions respectively comprising one or more database statements to be processed by the accelerator system; and the third database transactions respectively comprising at least one database statement to be processed by the DBMS and at least one statement to be processed by the accelerator system.

9. The computer-implemented method of claim 8, the method further comprising: creating, by the transaction manager, for each database transaction comprising at least one database statement which shall be processed by the accelerator system, one or more database connections between the DBMS and the accelerator system; and using, by the DBMS, the created one or more database connections for the dispatching of all database statements contained in the database transaction.

10. The computer-implemented method of claim 8, further comprising:
creating, by the transaction manager, for each of the data manipulation language statements which shall be dispatched to the accelerator system for being processed, a primary database connection between the DBMS and the accelerator system; and
creating, by the transaction manager, for each of the data manipulation language statements which shall be dispatched to the accelerator system for being processed and which perform a read operation, a secondary database connection between the DBMS and the accelerator system;

wherein:

the creation of the primary database connections and an execution of the database statements for which the primary database connections were created being executed sequentially in accordance with a chronological sequence of the statements in a requested transaction; and the creation of the secondary database connections and an execution of the database statements for which the secondary database connections were created being executed in parallel.

11. The computer-implemented method of claim 8, further comprising:

creating, by the transaction manager, for multiple consecutively received data manipulation language statements which shall be dispatched to the accelerator system for being processed and which perform an insert, update or delete operation, a primary database connection between the DBMS and the accelerator system; and creating, by the transaction manager, for each of the data manipulation language statements which shall be dispatched to the accelerator system for being processed and which perform a read operation, a secondary database connection between the DBMS and the accelerator system;

wherein:

the creation of the primary database connections and an execution of the database statements for which the primary database connections were created being executed sequentially in accordance with a chronological sequence of statements in a requested transaction; and the creation of the secondary database connections and an execution of the database statements for which the secondary database connections were created being executed in parallel.

12. A federated database system including:

a processor;

a memory;

an accelerator system; and a database management system (DBMS) structured and programmed to manage a first constituent database, with the DBMS including a single interface structured and programmed to receive database queries;

wherein:

the DBMS is structured and programmed to:

maintain a catalogue comprising first metadata and second metadata, the first metadata being descriptive of a structure of data containers of a first data container type stored in the first constituent database, the second metadata being descriptive of a structure of data containers of a second data container type stored in the accelerator system, evaluate, by the single interface, a first received database query to determine whether the first received database query includes a data definition language statement related to a creation or modification of a first data container in the DBMS and/or a data definition language statement related to a creation or modification of a second data container in the accelerator system, on condition that the evaluation determines that the first received database query includes a data definition language statement related to the creation or modification of the first data container of the first data container type:

provide, by the single interface, the data definition language statement to the database management system, and change the first data container type according to the data definition language statement, and on condition that the evaluation determines that the first received database query includes a data definition language statement related to the creation or modification of the second data container of the second data container type:

provide, by the single interface, the data definition language statement to the database management system, and create, by the DBMS, a trigger signal that causes the accelerator system to change the second data container type and update the second metadata in the catalogue such that the updated second metadata is descriptive of the changed second data container type; and the accelerator system is structured and programmed to:

receive a data manipulation language statement, dispatched from the DBMS, that was included in the first received database query, receive, from the DBMS, a first trigger signal, responsive to receipt of the first trigger signal:

change the second data container type to which the data manipulation language statement relates in the accelerator system, and update the second metadata in a catalogue such that the updated second metadata is descriptive of the changed second data container type, and responsive to dispatch of the database manipulation language statement, process the dispatched data manipulation language statement on data contained in instances of data containers of the second data container type stored in the accelerator system.

13. The federated database system of claim 12 wherein: the DBMS is optimized for processing database queries of a first database query type; and the accelerator system is optimized for processing database queries of a second database query type.

* * * * *